(12) United States Patent
Ooki

(10) Patent No.: US 9,078,054 B2
(45) Date of Patent: Jul. 7, 2015

(54) OPTICAL MODULE USED IN OPTICAL COMMUNICATION SYSTEMS, METHOD OF UPDATING FIRMWARE OF OPTICAL MODULE USED IN OPTICAL COMMUNICATION SYSTEMS, AND TROUBLE TRACING SYSTEM

(71) Applicant: Sumitomo Electric Industries, Ltd., Osaka-shi (JP)

(72) Inventor: Kazuyoshi Ooki, Yokohama (JP)

(73) Assignee: SUMITOMO ELECTRIC INDUSTRIES, LTD., Osaka-Shi (JP)

( * ) Notice: Subject to any disclaimer, the term of this patent is extended or adjusted under 35 U.S.C. 154(b) by 43 days.

(21) Appl. No.: 14/052,436

(22) Filed: Oct. 11, 2013

(65) Prior Publication Data

US 2014/0105601 A1   Apr. 17, 2014

(30) Foreign Application Priority Data

Oct. 15, 2012   (JP) .................................. 2012-228299
Oct. 24, 2012   (JP) .................................. 2012-234794

(51) Int. Cl.
| | |
|---|---|
| *H04J 14/00* | (2006.01) |
| *H04Q 11/00* | (2006.01) |
| *H04B 10/293* | (2013.01) |
| *G02B 6/35* | (2006.01) |

(52) U.S. Cl.
CPC ... *H04Q 11/0005* (2013.01); *H04Q 2011/0026* (2013.01); *H04Q 2011/0039* (2013.01); *G02B 6/3512* (2013.01); *G02B 6/3586* (2013.01); *H04B 10/2931* (2013.01); *H04B 2210/003* (2013.01)

(58) Field of Classification Search
CPC .............. H04B 10/564; H04B 10/572; H04B 10/2931; H04B 2210/003; H04Q 11/0001; H04Q 11/0005; H04Q 2011/0039; H04Q 2011/0026; G02B 6/3512; G02B 6/3586
USPC ........... 398/48–50, 82, 86–88, 135–138, 164, 398/197, 198
See application file for complete search history.

(56) References Cited

U.S. PATENT DOCUMENTS

| | | | |
|---|---|---|---|
| 7,949,025 B2* | 5/2011 | Olea | 372/38.02 |
| 2006/0024063 A1* | 2/2006 | Onaka et al. | 398/149 |
| 2006/0222289 A1* | 10/2006 | Takita et al. | 385/17 |
| 2007/0030176 A1* | 2/2007 | Sanchez-Olea et al. | 341/13 |

(Continued)

FOREIGN PATENT DOCUMENTS

| | | |
|---|---|---|
| JP | 2009-175614 A | 8/2009 |
| JP | 2012-105222 A | 5/2012 |

*Primary Examiner* — Dalzid Singh
(74) *Attorney, Agent, or Firm* — Venable LLP; Michael A. Sartori; Todd R. Farnsworth

(57) ABSTRACT

An optical module includes: an optical device driven by a driving voltage; an arithmetic processing chip including an arithmetic processing circuit that operates according to predetermined firmware and generates an electrical control signal indicating a magnitude of the driving voltage; a voltage generating unit provided outside the arithmetic processing chip, and including an input terminal that receives the control signal from the arithmetic processing chip and an output terminal that provides the driving voltage of a magnitude corresponding to the control signal to the optical device; and a voltage holding unit that holds an output voltage from the output terminal of the voltage generating unit at a constant voltage regardless of an operation state of the arithmetic processing circuit, when the firmware is updated.

9 Claims, 11 Drawing Sheets

(56) References Cited

U.S. PATENT DOCUMENTS

| | | | |
|---|---|---|---|
| 2009/0245727 A1* | 10/2009 | Shimizu et al. | 385/18 |
| 2010/0011134 A1* | 1/2010 | Brockmann et al. | 710/14 |
| 2012/0237212 A1* | 9/2012 | Nishihara et al. | 398/26 |
| 2012/0299481 A1* | 11/2012 | Stevens | 315/117 |

\* cited by examiner

*Fig.8*

| No. | CONTENTS | INFORMATION |
|---|---|---|
| 1 | TIME STAMP | ・TIME ELAPSED FROM ACTIVATION OF CPU |
| 2 | OPERATION INFORMATION | ・OPERATION CONTENTS (ACTIVATION, COMMANDS, AND THE LIKE)<br>・ASSOCIATED DATA |
| 3 | CONTROL INFORMATION | ・CONTROL CONTENTS (DEFINED FOR EACH FUNCTION)<br>・INPUT DATA<br>・CONTROL RESULTS |

*Fig.9*

| No. | CONTENTS | INFORMATION |
|---|---|---|
| 1 | TIME STAMP | • TIME ELAPSED FROM ACTIVATION OF CPU |
| 2 | TEMPERATURE MONITOR INFORMATION (OPTICAL SYSTEM) | • TEMPERATURE OF OPTICAL SYSTEM (OPTICAL DEFLECTIVE ELEMENT AND THE LIKE) |
| 3 | TEMPERATURE MONITOR INFORMATION (CASE) | • TEMPERATURE OF CASE THAT ACCOMMODATES OPTICAL SYSTEM |
| 4 | VOLTAGE MONITOR INFORMATION | • MAGNITUDE OF DRIVING VOLTAGE |
| 5 | ACCELERATION SENSOR INFORMATION | • DIRECTION OF GRAVITATIONAL ACCELERATION |

*Fig.10*

| No. | CONTENTS | INFORMATION |
|---|---|---|
| 1 | TIME STAMP | ·TIME ELAPSED FROM ACTIVATION OF CPU |
| 2 | ABNORMAL OPERATION OF PROGRAM | ·IDENTIFICATION INFORMATION OF EXCEPTION TRAP<br>·CHARACTER STRING INDICATING TYPE OF EXCEPTION |
| 3 | EXCEPTION DETECTED BY CPU | ·CHARACTER STRING INDICATING TYPE OF EXCEPTION |
| 4 | EXCEPTION OF PERIPHERAL DEVICE | ·CHARACTER STRING INDICATING TYPE OF ABNORMALITY |

*Fig.11*

| No. | CONTENTS | INFORMATION |
|---|---|---|
| 1 | TIME STAMP | • TIME ELAPSED FROM ACTIVATION OF CPU |
| 2 | EVENT THAT IS OUTSIDE DESIGN RANGE | • CHARACTER STRING INDICATING TYPE OF EVENT |
| 3 | ABNORMALITY THAT DOES NOT AFFECT OPERATION OF PROGRAM, WHICH OCCURS RARELY THOUGH | • CHARACTER STRING INDICATING TYPE OF EVENT |
| 4 | CONTROL CONTENT OTHER THAN NORMAL SYSTEM | • CHARACTER STRING INDICATING TYPE OF EVENT AND TYPE OF OPERATION PERFORMED THEREFOR |

OPTICAL MODULE USED IN OPTICAL COMMUNICATION SYSTEMS, METHOD OF UPDATING FIRMWARE OF OPTICAL MODULE USED IN OPTICAL COMMUNICATION SYSTEMS, AND TROUBLE TRACING SYSTEM

TECHNICAL FIELD

The present invention relates to an optical module used in optical communication systems, a method of updating firmware of an optical module used in optical communication systems, and a trouble tracing system.

BACKGROUND

Japanese Patent Application Publication No. 2009-175614 discloses a wavelength selective switch that separates signal light including a plurality of signal components having different wavelengths into respective signal components so that the separated signal components are output from different output ports. The wavelength selective switch comprises a microelectromechanical system (MEMS) mirror that switches the reflection directions of the respective signal components and a controller that applies a driving voltage to the MEMS mirror. The controller includes a firmware storage unit that stores a predetermined program, a central processing unit (CPU) that operates by loading the program from the firmware storage unit, and a digital-to-analog converter that receives a control signal from the CPU to generate the driving voltage.

Japanese Patent Application Publication No. 2012-105222 discloses an optical channel monitor as an optical transmission device that is used in an optical communication field. This optical channel monitor comprises an optical fiber that transmits an optical signal obtained by multiplexing a plurality of optical signals having different wavelengths, a coupler that allows a portion of the optical signal to branch off from the optical fiber, and a dispersive device and a light-receiving element that disperse the branched optical signal to detect the intensity of each wavelength. Moreover, this optical channel monitor comprises a random access memory (RAM) in which the central wavelength of each channel calculated from the detection results in the light-receiving element is temporarily stored and a nonvolatile memory such as a flash memory in which the central wavelength of each channel is periodically stored in order to compute a variation over time in the central wavelength of each channel.

SUMMARY

For example, an optical module that comprises an optical device that is driven with electric power such as a MEMS mirror, like the wavelength selective switch, is often used in an optical communication system. An optical amplifier that comprises a rare-earth doped optical fiber for amplifying signal light and an excitation light source that supplies excitation light to the rare-earth doped optical fiber is another example of the optical module that comprises such an optical device. In this optical amplifier, the excitation light source is driven with electric power.

In many cases, such an optical module comprises an arithmetic processing circuit such as a CPU that generates an electrical signal indicating the magnitude of electric power applied to the optical device (typically the magnitude of a voltage) and a voltage generating unit that generates a driving voltage of a magnitude corresponding to the electrical signal provided from the arithmetic processing circuit. The arithmetic processing circuit operates according to predetermined firmware such as a software program.

The firmware of the arithmetic processing circuit is updated as necessary. However, in general, when the firmware is to be updated, the arithmetic processing circuit is first reset and is then restarted. In a conventional optical module, the electrical signal provided to the voltage generating unit becomes indefinite when such an arithmetic processing circuit is restarted. In this case, if noise is superimposed on the electrical signal, there is a possibility that the driving voltage output from the voltage generating unit changes and the optical device performs an unexpected operation. In the optical communication system, it is desirable that a communication state is maintained even during firmware updating and such an unexpected operation of the optical device as described above is obviated.

Moreover, in a device that includes an arithmetic processing circuit such as a CPU, it is desirable that, when a trouble (abnormality) occurring in the device is detected, the details of the trouble are stored in a nonvolatile memory or the like as to be used for investigating (tracing) the causes thereof. In general, such a storing operation is performed in the event of a trouble and the details of the trouble and information (log) on an operation state during the occurrence of the trouble are stored in a nonvolatile memory or the like.

Further, when a trouble occurs in a device, various precursor phenomena must have occurred before. Knowing such phenomena is very useful for tracing. However, when the information on the operation state stored in the nonvolatile memory or the like is only the information at the time when the trouble occurs, it is difficult to perform such tracing.

Moreover, a method of periodically storing predetermined information in a nonvolatile memory as in the device disclosed in Japanese Patent Application Publication No. 2012-105222 may also be taken into considered. However, in general, since there is a limit in the number of writings to the nonvolatile memory, if the storing operation on the nonvolatile memory is performed periodically when the device operates normally, there is a problem in that the number of writings exceeds a limit so that various types of information could not be stored in the event of a trouble.

In order to solve the problems, an optical module used in optical communication systems according to the present invention comprises: an optical device driven by a driving voltage; an arithmetic processing chip including an arithmetic processing circuit that operates according to predetermined firmware and generates an electrical control signal indicating a magnitude of the driving voltage; a voltage generating unit provided outside the arithmetic processing chip, and including an input terminal that receives the control signal from the arithmetic processing chip and an output terminal that provides the driving voltage of a magnitude corresponding to the control signal to the optical device; and a voltage holding unit that holds an output voltage from the output terminal of the voltage generating unit at a constant voltage regardless of an operation state of the arithmetic processing circuit, when the firmware is updated.

In this optical module used in optical communication systems, the control signal indicating a driving voltage value for the optical device calculated in the arithmetic processing circuit is provided from the arithmetic processing circuit to the voltage generating unit. The voltage generating unit generates the driving voltage of the magnitude indicated by the control signal and provides the driving voltage to the optical device.

As described above, when the firmware of the arithmetic processing circuit is to be updated, the arithmetic processing circuit is first reset and is then restarted. In a conventional optical module, the electrical signal provided to the voltage generating unit becomes indefinite when such an arithmetic processing circuit is restarted. In this case, if noise is superimposed on the electrical signal, there is a possibility that the driving voltage output from the voltage generating unit changes and the optical device performs an unexpected operation. In contrast, in the optical module used in optical communication systems, when the firmware is updated, the voltage holding unit holds the output voltage from the output terminal of the voltage generating unit at the constant voltage regardless of the operation state of the arithmetic processing circuit. Thus, it is possible to obviate an unexpected operation of the optical device when the firmware is updated and to maintain a satisfactory communication state.

Moreover, in general, when the arithmetic processing circuit is reset and restarted, the entire arithmetic processing chip that incorporates the arithmetic processing circuit is reset and restarted. Thus, when the voltage generating unit is included in the arithmetic processing chip, the driving voltage output from the voltage generating unit is also reset and the voltage generating unit is also reset, which may affect the operation of the optical device. In contrast, in the optical module used in optical communication systems, since the voltage generating unit is provided outside the arithmetic processing chip, even when the entire arithmetic processing chip is reset and restarted, the voltage generating unit can continue its operation. Thus, it is possible to obviate an unexpected operation of the optical device and to maintain a satisfactory communication state.

In the optical module used in optical communication systems, the voltage generating unit may further include a chip selector input terminal that receives a chip selector signal and may switch between the output of the driving voltage of a magnitude corresponding to the control signal and the output of the constant voltage based on the chip selector signal, and the voltage holding unit may generate the chip selector signal so that the voltage generating unit outputs the constant voltage when the firmware is updated. Due to this, it is possible to hold the output voltage from the output terminal of the voltage generating unit at the constant voltage regardless of the operation state of the arithmetic processing circuit when the firmware is updated.

In the optical module used in optical communication systems, the voltage holding unit may be connected between the arithmetic processing chip and the input terminal of the voltage generating unit and may provide a control signal indicating the constant voltage to the input terminal of the voltage generating unit instead of the control signal indicating a magnitude of the driving voltage when the firmware is updated. Due to this, it is possible to hold the output voltage from the output terminal of the voltage generating unit at the constant voltage regardless of the operation state of the arithmetic processing circuit when the firmware is updated.

In the optical module used in optical communication systems, the constant voltage may be the same as the driving voltage immediately before the firmware is updated. Due to this, it is possible to preferably allow the optical device to continue its operation and to maintain a satisfactory communication state.

In the optical module used in optical communication systems, the firmware may be formed of a software program, and the arithmetic processing circuit may include a CPU that operates by reading the software program from a memory that stores the software program. Alternatively, in the optical module used in optical communication systems, the arithmetic processing circuit may include rewritable hardware capable of rewriting an internal circuit expressed by the firmware.

In the optical module used in optical communication systems, the optical device may be an optical deflective element for a wavelength selective switch. Alternatively, in the optical module used in optical communication systems, the optical device may be an excitation light source that supplies excitation light to an optical amplification unit for amplifying signal light. Alternatively, in the optical module used in optical communication systems, the optical device may be a variable optical attenuator that is optically coupled between a first optical amplification unit and a second optical amplification unit for amplifying signal light.

A method of updating firmware of an optical module used in optical communication systems according to the present invention is a method of updating firmware of an optical module used in optical communication systems, the optical module comprising: an arithmetic processing chip including an arithmetic processing circuit that operates predetermined firmware and generates an electrical control signal indicating a magnitude of a driving voltage for an optical device that is driven by the driving voltage; and a voltage generating unit that is provided outside the arithmetic processing chip and provides the driving voltage of a magnitude corresponding to the control signal to the optical device. The method includes: holding an output voltage from an output terminal of the voltage generating unit at a constant voltage and storing configuration information immediately before the firmware is updated; rewriting the firmware; and resetting the arithmetic processing circuit and restoring the configuration information immediately before the firmware is updated to allow the optical device to continue operating.

In this updating method, when the firmware is updated, since the output voltage from the output terminal of the voltage generating unit is held at the constant voltage, it is possible to obviate an unexpected operation of the optical device when the firmware is updated and to maintain a satisfactory communication state. Moreover, since the voltage generating unit is provided outside the arithmetic processing chip, even when the entire arithmetic processing chip is reset and restarted, the voltage generating unit can continue its operation. Thus, it is possible to obviate an unexpected operation of the optical device and to maintain a satisfactory communication state.

BRIEF DESCRIPTION OF THE DRAWINGS

FIG. 8 is a diagram illustrating an example of an operation trace log of an optical module and illustrates a trace log as the operation trace log;

FIG. 9 is a diagram illustrating an example of an operation trace log of the optical module and illustrates a monitor log as the operation trace log;

FIG. 10 is a diagram illustrating an example of a trouble log of the optical module and illustrates an exception log as the trouble log; and FIG. 11 is a diagram illustrating an example of a trouble log of the optical module and illustrates an alarm log as the trouble log.

DETAILED DESCRIPTION

Figure 1:
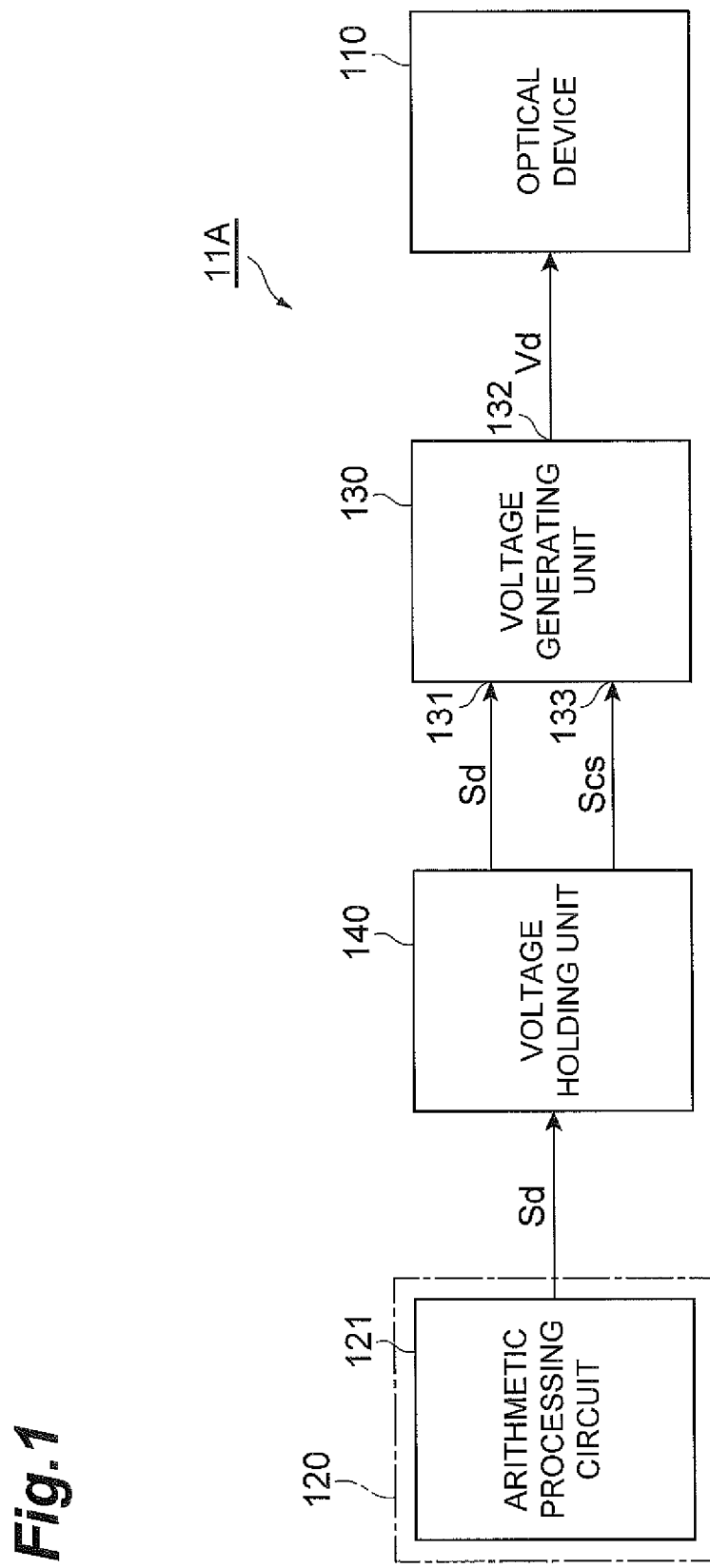
FIG. 1 is a block diagram schematically illustrating a configuration of an optical module according to a first embodiment.

Hereinafter, embodiments of an optical module used in optical communication systems, a method of updating firmware of an optical module used in optical communication systems, and a trouble tracing system according to the present invention will be described in detail with reference to the accompanying drawings. In the description of the drawings, the same constituent components will be denoted by the same reference numerals and redundant description thereof will not be provided.

(First Embodiment)

FIG. 1 is a block diagram schematically illustrating a configuration of an optical module 11A according to a first embodiment of the present invention. The optical module 11A of the present embodiment is an optical module used in an optical communication and is a device such as a wavelength selective switch or an optical amplifier, for example. As illustrated in FIG. 1, the optical module 11A comprises an optical device 110, an arithmetic processing chip 120 including an arithmetic processing circuit 121, a voltage generating unit 130, and a voltage holding unit 140.

The optical device 110 is an optical device that is driven by a driving voltage Vd. Examples of the optical device 110 include an optical deflective element (for example, a MEMS mirror or a liquid crystal on silicon (LCoS; registered trademark)), an excitation light source that supplies excitation light to a rare-earth doped optical fiber for amplifying signal light, and a variable optical attenuator that is optically coupled between two rare-earth doped optical fibers in order to make the loss applied to signal light variable.

The arithmetic processing circuit 121 is a large-scale integrated circuit for generating an electrical control signal Sd indicating the magnitude of the driving voltage Vd and operates according to predetermined firmware. The arithmetic processing circuit 121 includes a central processing unit (CPU), for example. When the arithmetic processing circuit 121 includes a CPU, the firmware is formed of a software program. The software program is stored in advance in a memory. The memory is a nonvolatile memory and is provided inside or outside the arithmetic processing circuit 121. The CPU of the arithmetic processing circuit 121 operates by reading the software program from the memory. Further, the arithmetic processing circuit 121 performs an operation of storing information set immediately before updating the firmware in the memory before the firmware is updated. The information stored at that time is a port set for each wavelength, a voltage set to a DAC, and the like, for example. The memory may be a nonvolatile memory or a volatile memory having such a function that the information stored therein is not erased even when the CPU is reset. An example of the volatile memory having the function that the information stored therein is not erased even when the CPU is reset includes a static RAM (SRAM) that does not require a periodic refresh operation.

Moreover, the arithmetic processing circuit 121 may be rewritable hardware capable of rewriting an internal circuit expressed by the firmware. Examples of the rewritable hardware include a programmable logic device (PLD), a field programmable gate array (FPGA), a digital signal processor (DSP), and the like. Even when the arithmetic processing circuit 121 is formed of these hardware components, the arithmetic processing circuit 121 can operate according to predetermined firmware and suitably generate the control signal Sd indicating the magnitude of the driving voltage Vd.

The control signal Sd is transmitted to the voltage generating unit 130 as digital data. A method of transmitting the control signal Sd may be a parallel method or a serial method. When a serial method is used, the control signal Sd is transmitted to the voltage generating unit 130 using a communication interface such as USART (RS232), SPI, or I2C, for example.

In either case when the arithmetic processing circuit 121 includes the CPU, or when the arithmetic processing circuit 121 includes a rewritable hardware component, the firmware is updated as necessary. The updating is performed in order to improve the function of the firmware and correct bugs. When the firmware is updated, the arithmetic processing circuit 121 is first reset and is then restarted.

The arithmetic processing circuit 121 is incorporated into the arithmetic processing chip 120. The arithmetic processing chip 120 has a package that seals the arithmetic processing circuit 121 mounted on a lead frame, for example, and is mounted on a wiring substrate (not illustrated). When the arithmetic processing circuit 121 includes the CPU, the arithmetic processing chip 120 may be a so-called micro processing unit (MPU).

The voltage generating unit 130 provides the driving voltage Vd of the magnitude corresponding to the control signal Sd to the optical device 110. The voltage generating unit 130 includes an input terminal 131 and an output terminal 132. The control signal Sd is input from the arithmetic processing circuit 121 to the input terminal 131. The driving voltage Vd of the magnitude corresponding to the control signal Sd is output from the output terminal 132. The voltage generating unit 130 is configured to include an analog-to-digital converter and converts the control signal Sd which is a digital signal provided from the arithmetic processing circuit 121 into the driving voltage Vd which is an analog signal.

Moreover, the voltage generating unit 130 is provided outside the arithmetic processing chip 120. Here, the outside of the arithmetic processing chip 120 means the outside of the package that seals the internal circuits (the arithmetic processing circuit 121 and the like) of the arithmetic processing chip 120. That is, the voltage generating unit 130 and the arithmetic processing chip 120 are mounted on different regions on a common wiring substrate and are electrically connected with each other by a wiring pattern formed on the wiring substrate.

The voltage holding unit 140 is a circuit portion for holding the output voltage from the output terminal 132 of the voltage generating unit 130 at a constant voltage regardless of the operation state of the arithmetic processing circuit 121 when updating the firmware of the arithmetic processing circuit 121. For example, the voltage holding unit 140 of the present embodiment is connected between the arithmetic processing chip 120 and the input terminal 131 of the voltage generating unit 130. The voltage holding unit 140 provides a control signal Sd indicating a constant voltage to the input terminal 131 of the voltage generating unit 130 instead of the control signal Sd indicating the magnitude of the driving voltage Vd.

Moreover, the voltage generating unit 130 may further includes a chip selector input terminal 133 that receives a chip selector signal Scs and may have a function of switching between the output of the driving voltage Vd of the magnitude corresponding to the control signal Sd and the output of a constant voltage based on the state of the chip selector signal Scs. In such a case, the voltage holding unit 140 may generate the chip selector signal Scs and provide the chip selector signal Scs to the chip selector input terminal 133 of the voltage generating unit 130 so that the voltage generating unit 130 outputs a constant voltage instead of, or as well as, providing the control signal Sd indicating the constant voltage when the firmware is updated.

The constant voltage output by the voltage generating unit 130 when the firmware is updated is preferably the same as the driving voltage Vd immediately before the updating.

Figure 2:
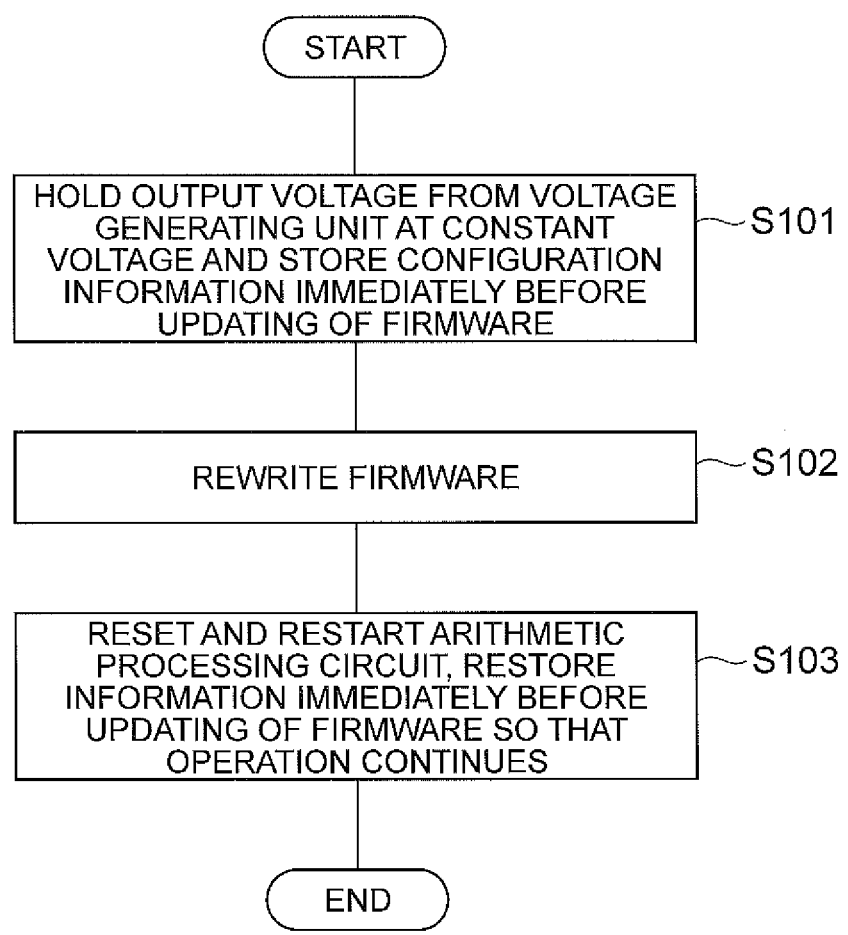
FIG. 2 is a flowchart illustrating an optical module firmware updating method.

FIG. 2 is a flowchart illustrating a method of updating the firmware of the optical module 11A according to the present embodiment. As illustrated in FIG. 2, when the firmware is updated, first, the voltage holding unit 140 holds the output voltage from the output terminal 132 of the voltage generating unit 130 at a constant voltage and stores the configuration information immediately before updating the firmware in a firmware update information storage unit (step S101). Subsequently, the arithmetic processing circuit 121 stops operating, and the firmware is rewritten (step S102). Subsequently, the arithmetic processing circuit 121 is reset and restarted, and the arithmetic processing circuit 121 starts operating according to the rewritten firmware, reads the information in the firmware update information storage unit, and restores the setting contents before the firmware is updated (step S103). In this case, the voltage holding unit 140 allows the control signal Sd indicating the magnitude of the driving voltage Vd to be provided from the arithmetic processing circuit 121 to the voltage generating unit 130.

Figure 3:
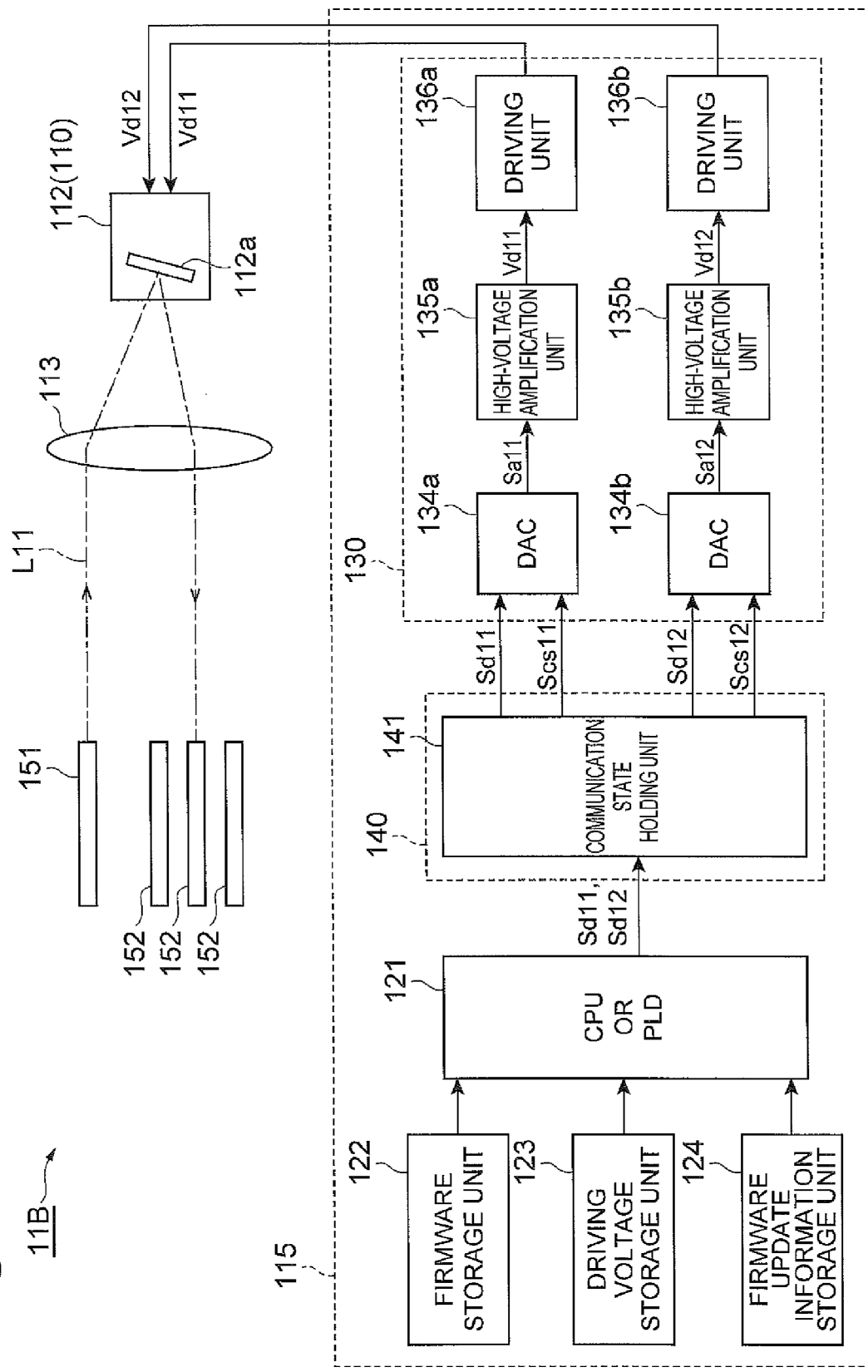
FIG. 3 is a diagram illustrating a configuration of a specific example of the optical module.

FIG. 3 is a diagram illustrating a configuration of an optical module 11B as a specific example of an optical module. This optical module 11B is a wavelength selective switch used in an optical communication system and comprises a MEMS mirror 112 which is an optical deflective element as the optical device 110. Moreover, the optical module 11B comprises an input optical waveguide 151 and a plurality of output optical waveguides 152. Signal light L11 emitted from the input optical waveguide 151 is reflected on a light reflecting surface 112a of the MEMS mirror 112 and selectively enters any one of the plurality of output optical waveguides 152 according to the reflection angle. The reflection angle on the light reflecting surface 112a is controlled according to two driving voltages (X-axis driving voltage Vd11 and Y-axis driving voltage Vd12) provided from a controller 115. A lens 113 is disposed between the input optical waveguide 151 and output optical waveguides 152 and the MEMS mirror 112.

The controller 115 includes the arithmetic processing circuit 121, the voltage generating unit 130, and the voltage holding unit 140 illustrated in FIG. 1. The arithmetic processing circuit 121 is formed of a large-scale integrated circuit such as a CPU or a PLD. A firmware storage unit 122, a driving voltage storage unit 123, and a firmware update information storage unit 124 are electrically connected to the arithmetic processing circuit 121.

The firmware storage unit 122 is a portion that stores firmware for operating the arithmetic processing circuit 121. As described above, the firmware storage unit 122 is formed of a nonvolatile memory, for example. Moreover, the firmware storage unit 122 may be included in the arithmetic processing chip 120 that incorporates the arithmetic processing circuit 121 and may be provided outside the arithmetic processing chip 120.

The driving voltage storage unit 123 is a portion for storing the magnitude of a driving voltage. The driving voltage storage unit 123 stores the magnitudes of the X-axis driving voltage Vd11 and the Y-axis driving voltage Vd12 for selectively reflecting the signal light L11 toward the respective output optical waveguides 152, for example. The arithmetic processing circuit 121 reads information on the suitable magnitudes of the X-axis driving voltage Vd11 and the Y-axis driving voltage Vd12 from the driving voltage storage unit 123 based on the selection information of the output optical waveguides 152 input from outside the optical module 11B, for example, and outputs control signals Sd11 and Sd12 corresponding to the magnitudes.

The firmware update information storage unit 124 is a portion for storing the configuration information before the firmware is updated. For example, the information that is to be maintained before and after the firmware is updated is the attenuation amount of the port set for each wavelength, a setting driving voltage, and the like. By maintaining these types of information, operations can be performed continuously without any difference in the setting value before and after the updating.

The voltage generating unit 130 includes D/A converters 134a and 134b, high-voltage amplification units 135a and 135b, and driving units 136a and 136b. The D/A converter 134a, the high-voltage amplification unit 135a, and the driving unit 136a are circuit portions for generating the X-axis driving voltage Vd11, and the D/A converter 134b, the high-voltage amplification unit 135b, and the driving unit 136b are circuit portions for generating the Y-axis driving voltage Vd12.

The D/A converter 134a converts a control signal Sd11 which is a digital signal output from the arithmetic processing circuit 121 into a control signal Sa11 which is an analog signal and outputs the control signal Sa11 to the high-voltage amplification unit 135a. The high-voltage amplification unit 135a converts the control signal Sa11 into the X-axis driving voltage Vd11 and outputs the X-axis driving voltage Vd11 to the driving unit 136a. The driving unit 136a supplies the X-axis driving voltage Vd11 to the MEMS mirror 112.

Moreover, the D/A converter 134b converts a control signal Sd12 which is a digital signal output from the arithmetic processing circuit 121 into a control signal Salt which is an analog signal and output the control signal Sa12 to the high-voltage amplification unit 135b. The high-voltage amplification unit 135b converts the control signal Sa12 into the Y-axis driving voltage Vd12 and outputs the Y-axis driving voltage Vd12 to the driving unit 136b. The driving unit 136b supplies the Y-axis driving voltage Vd12 to the MEMS mirror 112.

The voltage holding unit 140 has a communication state holding unit 141. The communication state holding unit 141 holds the output voltage from the voltage generating unit 130 at a constant voltage regardless of the operation state of the arithmetic processing circuit 121 when the firmware of the arithmetic processing circuit 121 is updated. For example, the communication state holding unit 141 of the present embodiment provides control signals Sd11 and Sd12 indicating the constant voltage to the D/A converters 134a and 134b instead of the control signals Sd11 and Sd12 indicating the magnitudes of the driving voltages Vd11 and Vd12 when the firmware is updated.

Moreover, the D/A converters 134a and 134b of the present embodiment further include a chip selector input terminal that receives chip selector signals Scs11 and Scs12 and have a function of switching between the output of the driving voltages Vd11 and Vd12 of the magnitudes corresponding to the control signals Sd11 and Sd12 and the output of the constant voltage based on the states of the chip selector signals Scs11 and Scs12. The communication state holding unit 141 generates the chip selector signals Scs11 and Scs12 and provides the signals to the chip selector input terminals of the D/A converters 134a and 134b so that the D/A converters 134a and 134b output a constant voltage instead of, or as well as, providing the control signals Sd11 and Sd12 indicating the constant voltage when the firmware is updated.

According to the optical modules 11A and 11B having the above configuration and the firmware updating method, the following advantages are obtained. As described above, in an optical communication system, it is preferable that a satisfactory communication state is maintained even when the firmware of the arithmetic processing circuit is updated. However, in a conventional optical module, when the firmware is updated, if the arithmetic processing circuit is first reset and is then restarted, there is a problem that the control signal provided to the voltage generating unit becomes indefinite, the driving voltage output from the voltage generating unit changes, and the optical device performs an unexpected operation. In contrast, in the optical modules 11A and 11B of the present embodiment, when the firmware is updated, the voltage holding unit 140 holds the output voltage from the output terminal 132 of the voltage generating unit 130 at a constant voltage regardless of the operation state of the arithmetic processing circuit 121. Thus, it is possible to obviate an unexpected operation of the optical device 110 (for example, the MEMS mirror 112) and to maintain a satisfactory communication state when the firmware is updated.

Moreover, in general, when the arithmetic processing circuit is reset and restarted, the entire arithmetic processing chip that incorporates the arithmetic processing circuit is reset and restarted. Thus, when the voltage generating unit is included in the arithmetic processing chip, the driving voltage output from the voltage generating unit is also reset and restarted, which may affect the operation of the optical device. In contrast, in the optical modules 11A and 11B of the present embodiment, since the voltage generating unit 130 is provided outside the arithmetic processing chip 120, even when the entire arithmetic processing chip 120 is reset and restarted, the voltage generating unit 130 can continue its operation. Thus, it is possible to obviate an unexpected operation of the optical device 110 (for example, the MEMS mirror 112) and to maintain a satisfactory communication state.

Moreover, as in the present embodiment, when the voltage generating unit 130 further includes the chip selector input terminal that receives the chip selector signal Scs (or Scs11 and Scs12) and has a function of switching between the output of the driving voltage Vd (or Vd11 and Vd12) of the magnitude corresponding to the control signal Sd (or Sd11 and Sd12) and the output of the constant voltage based on the chip selector signal Scs (or Scs11 and Scs12), the voltage holding unit 140 may generate the chip selector signal Scs (or Scs11 and Scs 12) so that the voltage generating unit 130 outputs a constant voltage when the firmware is updated. Due to this, it is possible to hold the output voltage from the output terminal of the voltage generating unit 130 at a constant voltage instead of the operation state of the arithmetic processing circuit 121 when the firmware is updated.

Moreover, as in the present embodiment, the voltage holding unit 140 may be connected between the arithmetic processing chip 120 and the input terminal of the voltage generating unit 130 and provide the control signal Sd (or Sd11 and Sd12) indicating the constant voltage to the input terminal of the voltage generating unit 130 regardless of the control signal Sd (or Sd11 and Sd12) indicating the magnitude of the driving voltage Vd (or Vd11 and Vd12) when the firmware is updated. Due to this, it is possible to hold the output voltage from the output terminal of the voltage generating unit 130 at a constant voltage regardless of the operation state of the arithmetic processing circuit 121 when the firmware is updated.

Further, as in the present embodiment, the constant voltage output from the voltage generating unit 130 when the firmware is updated is preferably the same as the driving voltage Vd (or Vd11 and Vd12) immediately before the updating. Due to this, it is possible to preferably allow the optical device 110 (for example, the MEMS mirror 112) to continue its operation and to maintain a satisfactory communication state.

(Second Embodiment)

Figure 4:
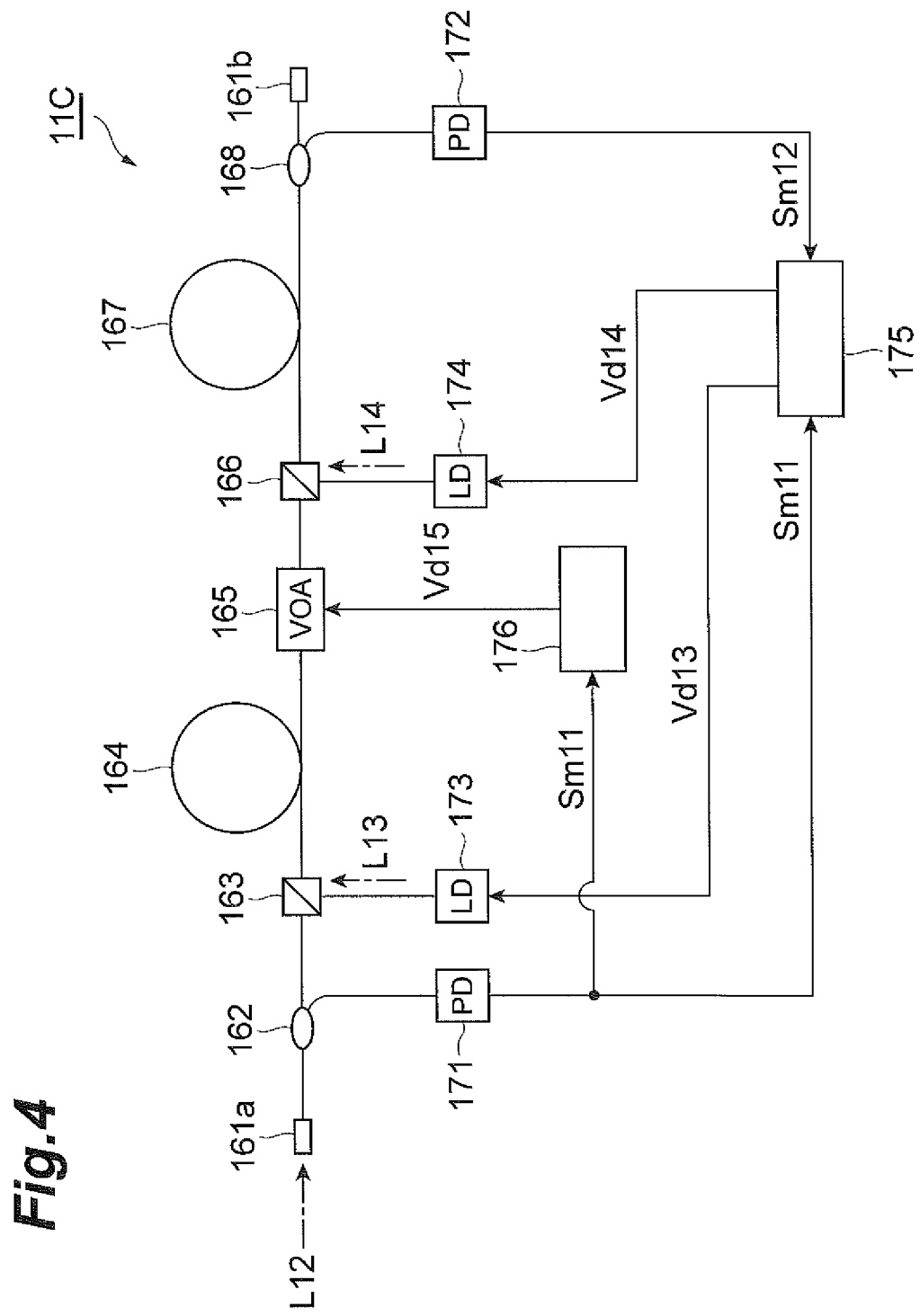
FIG. 4 is a diagram illustrating a configuration of an optical module according to a second embodiment.

FIG. 4 is a diagram illustrating a configuration of an optical module 11C according to a second embodiment of the present invention. The optical module 11C of the present embodiment is one of specific examples of the optical module 11A illustrated in FIG. 1 and is an optical amplifier used in an optical communication system. The optical module 11C illustrated in FIG. 4 optically amplifies signal light L12 input to an input terminal 161a to output the light from an output terminal 161b. The optical module 11C comprises an optical coupler 162, an optical coupler 163, an optical amplification unit 164, a variable optical attenuator (VOA) 165, an optical coupler 166, an optical amplification unit 167, and an optical coupler 168 which are arranged in that order on a transmission path of the signal light L12 extending from the input terminal 161a to the output terminal 161b. The variable optical attenuator 165 is a constituent component corresponding to the optical device 110 illustrated in FIG. 1.

Moreover, the optical module 11C comprises light-receiving element 171 connected to the optical coupler 162, a light-receiving element 172 connected to the optical coupler 168, an excitation light source 173 connected to the optical coupler 163, an excitation light source 174 connected to the optical coupler 166, a controller 175 that controls the excitation light sources 173 and 174, and a controller 176 that controls the variable optical attenuator 165. The excitation light sources 173 and 174 are constituent components corresponding to the optical device 110 illustrated in FIG. 1.

The optical coupler 162 receives the arriving signal light L12 input to the input terminal 161a, outputs the signal light L12 to the optical coupler 163, allows a portion of the signal light L12 to branch, and outputs the same to the light-receiving element 171. The optical coupler 163 receives the arriving signal light L12 output from the optical coupler 162, receives arriving excitation light L13 output from the excitation light source 173, and outputs the signal light L12 and the excitation light L13 to the optical amplification unit 164. The optical amplification unit 164 receives the arriving signal light L12 and excitation light L13 output from the optical coupler 163, optically amplifies the signal light L12 excited by the excitation light L13, and outputs the amplified light. The optical amplification unit 164 is preferably a rare-earth doped optical fiber such as an erbium doped fiber (EDF).

The variable optical attenuator 165 is optically coupled between the optical amplification unit 164 (first optical amplification unit) and the optical amplification unit 167 (second optical amplification unit) for amplifying the signal light L12. The variable optical attenuator 165 receives the signal light L12 optically amplified and output by the optical amplification unit 164, applies a loss to the signal light L12, and outputs the light to the optical amplification unit 167. The loss applied to the signal light L12 by the variable optical attenuator 165 is variable.

The optical coupler 166 receives the arriving signal light L12 output from the variable optical attenuator 165, receives arriving excitation light L14 output from the excitation light source 174, and outputs the signal light L12 and the excitation light L14 to the optical amplification unit 167. The optical amplification unit 167 receives the arriving signal light L12 and excitation light L14 output from the optical coupler 166, optically amplifies the signal light L12 excited by the excitation light L14, and outputs the amplified light. The optical amplification unit 167 is preferably a rare-earth doped optical fiber such as an EDF. The optical coupler 168 receives the signal light L12 amplified and output by the optical amplification unit 167, outputs the signal light L12 to the outside from the output terminal 161b, allows a portion of the signal light L12 to branch, and outputs the same to the light-receiving element 172.

The light-receiving element 171 outputs an electrical signal Sm11 indicating the optical intensity of the arriving signal light L12 branched by the optical coupler 162. The light-receiving element 172 outputs an electrical signal Sm12 indicating the optical intensity of the arriving signal light L12 branched by the optical coupler 168. The excitation light source 173 outputs the excitation light L13 of a wavelength that can excite the optical amplification unit 164 to the optical coupler 163. The excitation light source 174 outputs the excitation light L14 of a wavelength that can excite the optical amplification unit 167 to the optical coupler 166. Photodiodes are preferably used as the light-receiving elements 171 and 172. Semiconductor laser light sources are preferably used as the excitation light sources 173 and 174.

The controller 175 calculates a total gain occurring in the optical amplification units 164 and 167 based on the electrical signals Sm11 and Sm12 provided from the light-receiving elements 171 and 172 by taking the loss in the variable optical attenuator 165 into consideration and controls the intensity of the excitation light L13 and of the excitation light L14 so that the total gain becomes a predetermined gain. That is, the controller 175 provides driving voltages Vd13 and Vd14 of a suitable magnitude to the excitation light sources 173 and 174 based on the electrical signals Sm11 and Sm12 provided from the light-receiving elements 171 and 172.

The controller 176 controls the loss of the variable optical attenuator 165 so that the intensity of the signal light L12 becomes a predetermined magnitude based on the electrical signal Sm11 provided from the light-receiving element 171. That is, the controller 176 provides a driving voltage Vd15 of a suitable magnitude to the variable optical attenuator 165 based on the electrical signal Sm11 provided from the light-receiving element 171.

Here, the controllers 175 and 176 of the present embodiment have the same configuration as the controller 115 illustrated in FIG. 3. That is, the controllers 175 and 176 comprise the arithmetic processing circuit 121, the firmware storage unit 122, the driving voltage storage unit 123, the voltage holding unit 140 that includes the communication state holding unit 141, and the voltage generating unit 130 as illustrated in FIG. 3. However, the voltage generating unit 130 of the controller 176 may preferably include at least the D/A converter 134a, the high-voltage amplification unit 135a, and the driving unit 136a illustrated in FIG. 3.

The controller 175 supplies the driving voltage Vd13 to the excitation light source 173 and controls the magnitude of the driving voltage Vd13. Moreover, the controller 175 supplies the driving voltage Vd14 to the excitation light source 174 and controls the magnitude of the driving voltage Vd14. The controller 176 supplies the driving voltage Vd15 to the variable optical attenuator 165 and controls the magnitude of the driving voltage Vd15.

Since the controllers 175 and 176 comprise the voltage holding unit 140 similarly to the controller 115 illustrated in FIG. 3, the output voltage from the voltage generating unit 130 is held at a constant voltage regardless of the operation state of the arithmetic processing circuit 121 when the firmware stored in the firmware storage unit 122 is updated. Thus, it is possible to obviate an unexpected operation of the optical device 110 (in the present embodiment, the excitation light sources 173 and 174 and the variable optical attenuator 165) and to maintain a satisfactory communication state when the firmware is updated. Further, since the controllers 175 and 176 have the same configuration as the controller 115 illustrated in FIG. 3, it is equally possible to obtain the other advantages of the first embodiment.

The optical module used in optical communication systems and the method of updating firmware of an optical module used in optical communication systems according to the present invention are not limited to the embodiments and various other modifications can occur. For example, in the respective embodiments described above, although the MEMS mirror, the excitation light source, and the variable optical attenuator have been illustrated as an example of the optical device, the optical device of the present invention is not limited to these examples as long as they are used in an optical communication system and are driven by a driving voltage.

(Third Embodiment)

Figure 5:
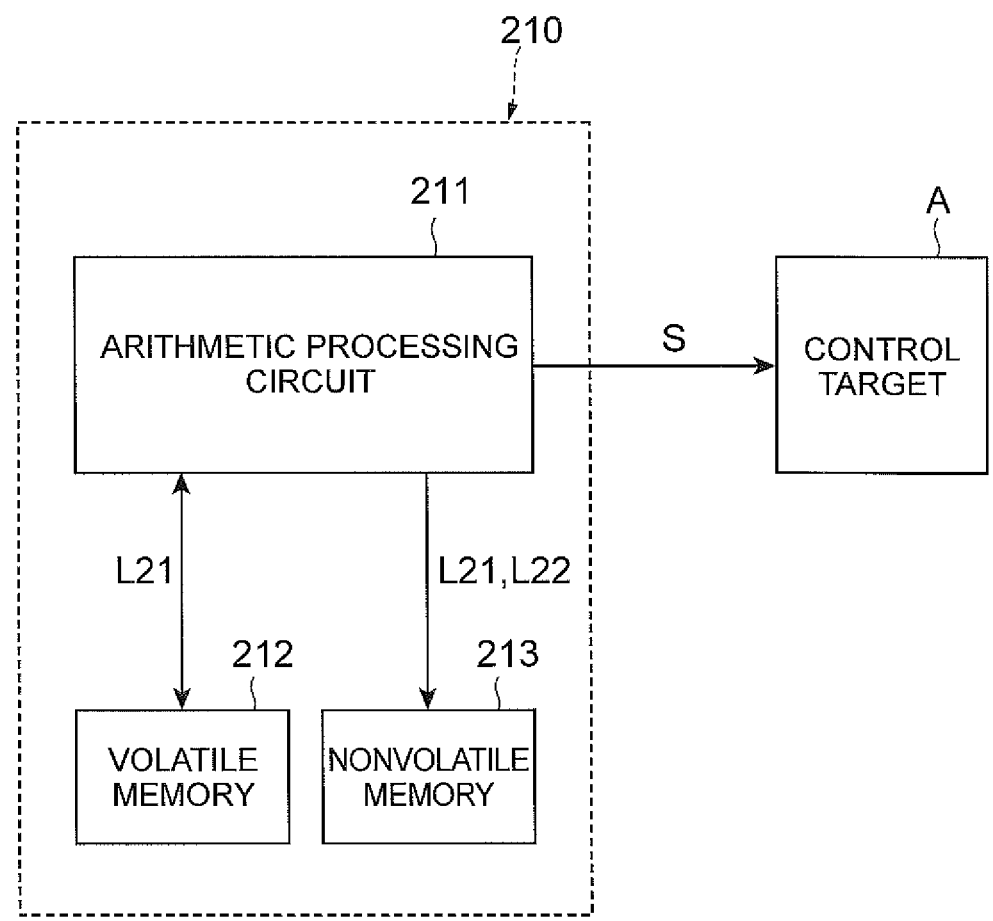
FIG. 5 is a block diagram illustrating a basic configuration of a trouble tracing system according to a third embodiment.

FIG. 5 is a block diagram illustrating a basic configuration of a trouble tracing system according to an embodiment of the present invention. A trouble tracing system 210 illustrated in FIG. 5 is a device for tracing information on a trouble in a device that includes an arithmetic processing circuit 211. In addition to the arithmetic processing circuit 211, the trouble tracing system 210 further comprises a volatile memory 212 and a nonvolatile memory 213 connected to the arithmetic processing circuit 211.

The arithmetic processing circuit 211 is a large-scale integrated circuit that performs a predetermined process according to a predetermined program or the like. Examples of the arithmetic processing circuit 211 includes a micro processing unit (MPU) such as a central processing unit (CPU), a programmable logic device (PLD), a field programmable gate array (FPGA), a digital signal processor (DSP), and the like. The arithmetic processing circuit 211 periodically performs a predetermined arithmetic process and generates a control signal S for operating various control targets A of the device. For example, when the device is a wavelength selective switch (WSS) used in an optical communication system, an optical deflective element that reflects a plurality of dispersed signal components in different directions can be the control target A. Examples of such an optical deflective element include a microelectromechanical systems (MEMS) mirror, a liquid crystal on silicon (LCoS), and the like.

Moreover, when the device operates normally, the arithmetic processing circuit 211 periodically generates information (for example, a control signal value or the like, hereinafter referred to as an operation trace log) L21 on the operation of the device while generating the control signal S and periodically stores (writes) the operation trace log L21 in an operation trace log storage area of the volatile memory 212. The cycle of storing the operation trace log L21 may be the same as the cycle of computing the control signal S and may be longer than the cycle of computing the control signal S. The volatile memory 212 can be preferably formed of a RAM, for example.

Moreover, the arithmetic processing circuit 211 always monitors whether a trouble (abnormality) is present in the device or the arithmetic processing circuit 211 itself. When a trouble occurs in the device or the arithmetic processing circuit 211 itself, the arithmetic processing circuit 211 reads one or a plurality of operation trace logs L21 generated before the occurrence of the trouble from the volatile memory 212 and stores the operation trace log L21 in a trouble trace information storage area of the nonvolatile memory 213 together with information (hereinafter referred to as a trouble log) L22 on the details of the trouble. The nonvolatile memory 13 can be preferably formed of a flash memory, for example.

Figure 6:
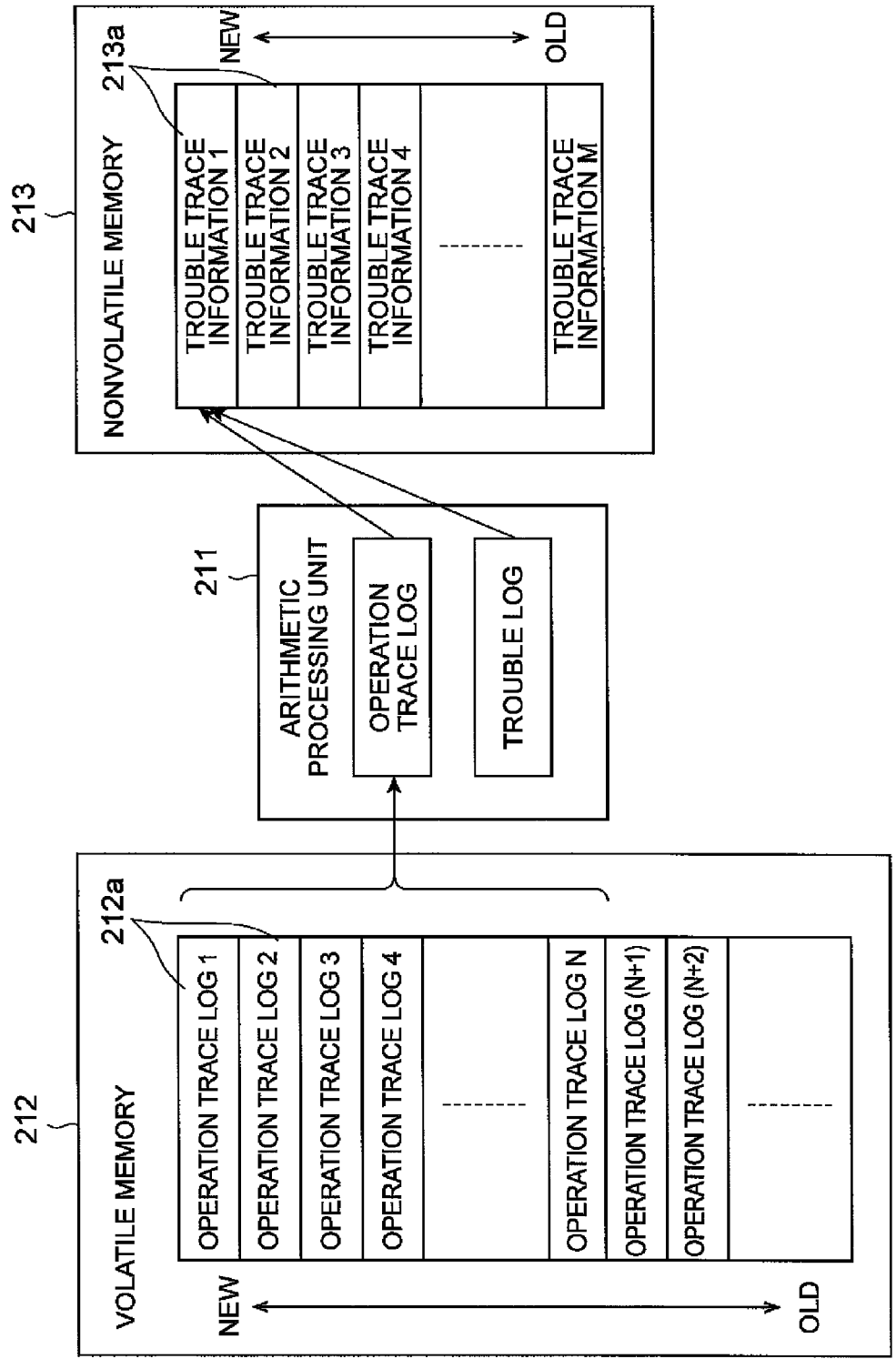
FIG. 6 is a diagram schematically illustrating an inner structure of a volatile memory and a nonvolatile memory.

FIG. 6 is a diagram schematically illustrating an inner structure of the volatile memory 212 and the nonvolatile memory 213. As illustrated in FIG. 6, a plurality of operation trace log storage areas 212a is provided inside the volatile memory 212. The plurality of operation trace log storage areas 212a forms a ring buffer (of a round robin type), and the operation trace logs are stored in the volatile memory 212 in a first-in-first-out manner. That is, whenever a newest operation trace log is stored in the volatile memory 212, the oldest operation trace log is erased from the volatile memory 212 so that the number of operation trace logs in the volatile memory 212 is maintained at a constant number. When the oldest operation trace log is erased, a log discard flag may be set to the rewritten operation trace log to indicate that an absent log is present.

Moreover, a plurality of trouble trace information storage areas 213a is provided inside the nonvolatile memory 213. Each of the trouble trace information storage areas 213a corresponds to one trouble occurrence event. When a trouble occurs, the arithmetic processing circuit 211 stores trouble trace information including one trouble log and a plurality of operation trace logs to one trouble trace information storage area 213a. In this case, the arithmetic processing circuit 211 traces back from the newest operation trace log to read approximately one hundred operation trace logs from the volatile memory 212 and stores the same in the nonvolatile memory 213 as a group of items of trouble trace information together with a trouble log. This trouble trace information is preferably stored in the order (from oldest to newest) in which troubles occur in the nonvolatile memory 213 and is managed as a queue so that the items of information are extracted sequentially from the oldest trouble trace information. Moreover, similarly to the volatile memory 212, the plurality of trouble trace information storage areas 213a forms a ring buffer (of a round robin type) and the trouble trace information may preferably be stored in the nonvolatile memory 213 in a first-in-first-out manner.

In the present embodiment, the volatile memory 212 may be included in the same package as that of the arithmetic processing circuit 211 and may be included in a package different from that of the arithmetic processing circuit 211. Similarly, the nonvolatile memory 213 may be included in the same package as that of the arithmetic processing circuit 211 and may be included in a package different from that of the arithmetic processing circuit 211. Moreover, the capacity of the nonvolatile memory 213 is preferably larger than the capacity of the volatile memory 212 so that, even when a plurality of troubles occurs, the operation trace logs stored in the volatile memory 212 in the event of the respective troubles can be stored in the nonvolatile memory 213.

For the convenience of tracing a trouble, the trouble log preferably includes at least one of information (error code) on the type of the trouble and information (time stamp) on the time when the trouble log is generated. Moreover, the operation trace log preferably includes information (time stamp) on the time when the operation trace log is generated. Further, when a trouble occurs in the device, the arithmetic processing circuit 211 preferably stores an operation trace log older than the trouble log relating to the trouble in the trouble trace information storage area 213a together with the trouble log.

Moreover, the trouble tracing system 210 may further comprise a data output port for extracting the trouble log and the operation trace log stored in the nonvolatile memory 213 from the nonvolatile memory 213 during maintenance or inspection of the device.

Figure 7:
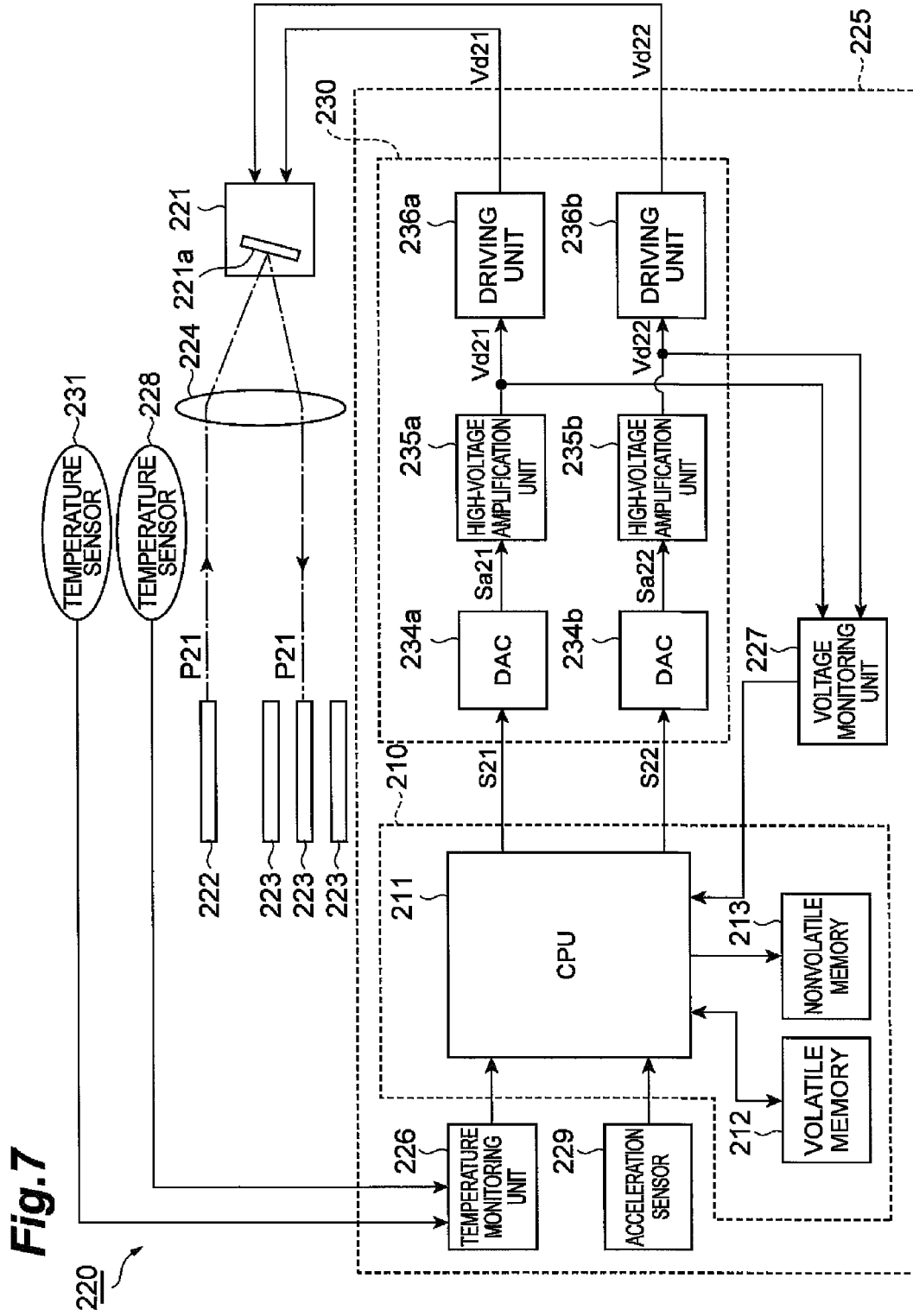
FIG. 7 is a diagram illustrating a configuration of an optical module used in an optical communication system as a specific example of a device to which the trouble tracing system is applied.

FIG. 7 is a diagram illustrating a configuration of an optical module 220 used in an optical communication system as a specific example of a device to which the trouble tracing system 210 is applied. The optical module 220 is a wavelength selective switch used in the optical communication system.

The optical module 220 comprises an optical deflective element 221 and a controller 225 that applies a driving voltage to the optical deflective element 221. The optical deflective element 221 is an optical device that is driven by the driving voltage and is an element that corresponds to the control target A illustrated in FIG. 5. The optical deflective element 221 is formed of a MEMS mirror or an LCoS, for example. Moreover, the optical module 220 comprises an input optical waveguide 222 and a plurality of output optical waveguides 223. Signal light P21 emitted from the input optical waveguide 222 is reflected on a light reflecting surface 221a of the optical deflective element 221 and selectively enters any one of the plurality of output optical waveguides 223 according to the reflection angle. The reflection angle on the light reflecting surface 221a is controlled according to two driving voltages (X-axis driving voltage Vd21 and Y-axis driving voltage Vd22) provided from a controller 225. A lens 224 may be disposed between the input optical waveguide 222 and the plurality of output optical waveguides 223, and the optical deflective element 221.

The controller 225 includes a trouble tracing system 210 and a voltage generating unit 230. The trouble tracing system 210 includes the same constituent components as those illustrated in FIG. 5 (that is, an arithmetic processing circuit 211, a volatile memory 212, and a nonvolatile memory 213). Moreover, in this optical module 220, the arithmetic processing circuit 211 generates electrical control signals S21 and S22 indicating the magnitudes of the driving voltages Vd21 and Vd22. The control signals 521 and S22 are transmitted to the voltage generating unit 230 as digital data. A method of transmitting the control signals S21 and S22 may be a parallel method or a serial method. When a serial method is used, the control signals 521 and S22 are transmitted to the voltage generating unit 230 using a communication interface such as RS232, for example.

The voltage generating unit 230 receives the control signals S21 and S22 from the arithmetic processing circuit 211 and provides driving voltages Vd21 and Vd22 of the magnitudes corresponding to the control signals S21 and S22 to the optical deflective element 221. The voltage generating unit 230 is configured to include an analog-to-digital converter. As an example, the voltage generating unit 230 includes D/A converters 234a and 234b, high-voltage amplification units 235a and 235b, and driving units 236a and 236b. The D/A converter 234a, the high-voltage amplification unit 235a, and the driving unit 236a are circuit portions for generating the X-axis driving voltage Vd21, and the D/A converter 234b, the high-voltage amplification unit 235b, and the driving unit 236b are circuit portions for generating the Y-axis driving voltage Vd22.

The D/A converter 234a converts the control signal S21 which is a digital signal output from the arithmetic processing circuit 211 into a control signal Sa21 which is an analog signal and outputs the control signal Sa21 to the high-voltage amplification unit 235a. The high-voltage amplification unit 235a converts the control signal Sa21 into the X-axis driving voltage Vd21 and outputs the X-axis driving voltage Vd21 to the driving unit 236a. The driving unit 236a supplies the X-axis driving voltage Vd21 to the optical deflective element 221.

Moreover, the D/A converter 234b converts a control signal S22 which is a digital signal output from the arithmetic processing circuit 211 into a control signal Sa22 which is an analog signal and outputs the control signal Sa22 to the high-voltage amplification unit 235b. The high-voltage amplification unit 235b converts the control signal Sa22 into the Y-axis driving voltage Vd22 and outputs the Y-axis driving voltage Vd22 to the driving unit 236b. The driving unit 236b supplies the Y-axis driving voltage Vd22 to the optical deflective element 221.

Moreover, as illustrated in FIG. 7, the controller 225 further includes a temperature monitoring unit 226, a voltage monitoring unit 227, and an acceleration sensor 229. A temperature sensor 228 is a first temperature sensor of the present embodiment and outputs a first temperature signal indicating a temperature of a predetermined location in the optical module 220 (for example, a temperature near an optical system (the optical deflective element 221, the input optical waveguide 222, the output optical waveguide 223, and the lens 224) of the optical module 220). The temperature monitoring unit 226 receives the first temperature signal obtained from the temperature sensor 228 and provides first temperature information on the ambient temperature of the temperature sensor 228 to the arithmetic processing circuit 211. When the first temperature information indicates an abnormal value (typically, the first temperature information exceeds a predetermined temperature), the arithmetic processing circuit 211 determines the first temperature information to be a trouble log and stores the first temperature information in the trouble trace information storage area 213a. In addition to the temperature sensor 228, another temperature sensor 231 (second temperature sensor) may be further provided. In this case, the temperature sensor 231 outputs the second temperature signal indicating a temperature of another location in the optical module 220 to the temperature monitoring unit 226. Moreover, the temperature monitoring unit 226 provides second temperature information based on the second temperature signal to the arithmetic processing circuit 211. When a plurality of temperature sensors is provided in this manner, by comparing these items of temperature information with each other, it is possible to specify the location of an abnormality (trouble) such as overheating and to specify a troubled temperature sensor. For example, one temperature sensor 228 is provided near an optical system (for example, on the optical deflective element 221) inside a case that accommodates the optical system (the optical deflective element 221, the input optical waveguide 222, the output optical waveguide 223, and the lens 224) of the optical module 220, for example, and outputs the first temperature signal indicating a temperature of that location. Moreover, the other temperature sensor 231 is provided on or near a case that accommodates an optical system, for example, and outputs the second temperature signal indicating a temperature of the case. When the temperature of the case is measured, although the temperature sensor 231 is preferably provided on an electronic component which is a heat source or a wiring substrate on which the electronic component is mounted, the temperature sensor 231 may be disposed outside the case in a state of being thermally coupled to the case, for example. The arithmetic processing circuit 211 can compare the first and second items of temperature information obtained from these temperature sensors 228 and 231 and determine the first temperature information (or second temperature information) to be a trouble log when the compared value exceeds a predetermined value.

The voltage monitoring unit 227 detects the magnitudes of the driving voltages Vd21 and Vd22 of the voltage generating unit 230 and provides information on the magnitudes of the driving voltages Vd21 and Vd22 to the arithmetic processing circuit 211. When the magnitude of the driving voltage Vd21 or Vd22 does not fall within a predetermined range, the arithmetic processing circuit 211 determines that an abnormality (trouble) occurred in the driving voltage Vd21 or Vd22, that is, an abnormality (trouble) occurred in the voltage generating unit 230.

The acceleration sensor 229 is a sensor for detecting the magnitude or the direction of gravitational acceleration in relation to the optical module 220. When the optical module 220 is used, the case that accommodates the optical system is attached to a rack or the like in various directions. When the optical deflective element is formed of a MEMS, for example, since the operating properties of the MEMS is slightly different according to the direction of gravitational acceleration applied to the MEMS, it is preferable to correct the driving voltage value according to the direction of gravitational acceleration. The arithmetic processing circuit 211 detects the direction of gravitational acceleration based on a signal obtained from the acceleration sensor 229 and corrects the control signals S21 and S22 according to the direction of gravitational acceleration. Moreover, when the signal obtained from the acceleration sensor 229 does not fall within a predetermined range, the arithmetic processing circuit 211 determines that an abnormality (trouble) occurred in the acceleration sensor 229.

Here, FIGS. 8 to 11 are diagrams illustrating examples of an operation trace log and a trouble log of the optical module 220. FIG. 8 illustrates a trace log as the operation trace log. The information included in the trace log is information on the handling of the optical module 220 or the operation of a program and is preferably grasped in a time-series manner. As illustrated in FIG. 8, the trace log includes a time stamp indicating the time elapsed from activation of the arithmetic processing circuit 211; handling contents such as activation or commands and items of data associated with the handlings; and control contents defined for each function, items of control input data, and control results. When a portion of the items of data associated with operations does not fall within the operation trace log storage area, the items of data may be replaced with a representative value thereof. Similarly, when a portion of the items of control input data does not fall within the operation trace log storage area, the items of control input data may be replaced with a representative value thereof.

FIG. 9 illustrates a monitor log as an operation trace log. The information included in the monitor log is measurement values or the like of a sensor that monitors the state of the optical module 220 and is preferably grasped in a time-series manner. As illustrated in FIG. 9, the monitor log includes a time stamp indicating the time elapsed from activation of the arithmetic processing circuit 211; temperature monitor information on the temperature of an optical system such as an optical deflective element; temperature monitor information on the temperature of a case that accommodates an optical system; voltage monitor information indicating the magnitudes of the driving voltages Vd21 and Vd22; and acceleration sensor information indicating the direction of gravitational acceleration.

FIG. 10 illustrates an exception log as a trouble log. The information included in the exception log is information for grasping the type or the cause of an exception occurring in the optical module 220. As illustrated in FIG. 10, the exception log includes a time stamp indicating the time elapsed from activation of the arithmetic processing circuit 211; identification information of an exception trap relating to an abnormal operation of a program and a character string indicating the type of exception; a character string indicating an exception (the type of exception) detected in the arithmetic processing circuit 211; and a character string indicating the type of abnormality relating to an exception of a peripheral device.

FIG. 11 is an alarm log as a trouble log. The information included in the alarm log is information for grasping the type or the cause of a situation that is outside a design range, occurring in the optical module 220. As illustrated in FIG. 11, the alarm log includes a time stamp indicating the time elapsed from activation of the arithmetic processing circuit 211; a character string indicating the type of an event that is outside a design range; a character string indicating the type of an event relating to an abnormality that does not affect the operation of a program, which occurs rarely though; and a character string indicating a control content (the type of event and the type of control performed therefor) other than a normal system.

Among the respective logs described above, the exception log and the alarm log are immediately stored in the nonvolatile memory 213 by the arithmetic processing circuit 211 after a trouble (abnormality) occurs. Moreover, the trace log and the monitor log are periodically stored in the volatile memory 212 at a predetermined time interval (for example, every 10 minutes) when the optical module 220 operates normally.

There may be a case that, a case where once a trouble (abnormality) occurs, the trouble is continuously detected by the arithmetic processing circuit 211. In such a case, if the exception log and the alarm log are stored in the nonvolatile memory 213 whenever a trouble is detected, items of trouble trace information on other troubles (abnormalities) stored in the past are overwritten in a short time and deleted. In order to obviate such a situation, the arithmetic processing circuit 211 preferably suppresses writing of unnecessary logs.

Advantages obtained by the trouble tracing system 210 of the present embodiment described above will be described. In the trouble tracing system 210, for example, when a device such as the optical module 220 operates normally, the operation trace log which is information on the operation of the device is periodically generated and is periodically stored in the volatile memory 212. In general, there is not a limit in the number of writings to the volatile memory 212 such as a RAM, and such a periodic storing operation can be performed preferably. Moreover, when a trouble occurs in the device, since the operation trace log stored in the volatile memory 212 before the trouble occurs is stored in the nonvolatile memory 213 together with the trouble log which is information on the trouble, it is sufficient to perform the storing operation to the nonvolatile memory 213 in the event of the trouble only and it is not necessary to perform the operation periodically. Thus, according to the trouble tracing system 210, it is possible to store the information on the operation of the device before the trouble occurs in the nonvolatile memory 213 together with the information on the trouble while suppressing the number of writings to the nonvolatile memory 213.

Moreover, as in the present embodiment, the nonvolatile memory 213 preferably has a plurality of trouble trace information storage areas 213a, and the arithmetic processing circuit 211 preferably stores one or a plurality of operation trace logs and trouble logs in each of the plurality of trouble trace information storage areas 213a every time when the trouble occurs in the device. Although there is a case where the device comprising the trouble tracing system 210 is requested to continuously perform operations for a long period depending on the type thereof, due to such a configuration, it is possible to preferably trace troubles even when a plurality of troubles occurs during the long period of operations Moreover, as in the present embodiment, the capacity of the nonvolatile memory 213 is preferably larger than the capacity of the volatile memory 212. Due to this, it is possible to store various items of information during the occurrence of troubles in the device in the nonvolatile memory 213 together with the operation trace log.

Moreover, as in the present embodiment, the operation trace log is preferably stored in the volatile memory 212 in a first-in-first-out manner. Due to this, the operation trace log immediately before the occurrence of troubles that is particularly useful for tracing troubles can be preferably stored in the nonvolatile memory 213.

Moreover, in general, an optical module used in an optical communication system is requested to operate for a very long period, and there is a little chance to trace troubles. Since the optical module 220 of the present embodiment comprises the trouble tracing system 210, it is possible to suppress the number of storing operations to the nonvolatile memory 213 during a long period of operations and to store the information on the operation of the optical module 220 before the occurrence of the trouble in the nonvolatile memory 213 together with the information on the trouble. Thus, it is possible to effectively utilize a small number of chances for tracing. Moreover, when a trouble occurs in the optical module used in the optical communication system, although the optical module is collected by a manufacturer for repair, in this case, the power of the optical module is turned off In such a case, since the trouble trace information is stored in the nonvolatile memory 213, it is possible to trace the trouble.

The trouble tracing system and the optical module used in optical communication systems according to the present invention are not limited to the above embodiments and various other modifications can occur. For example, in the above embodiments, an optical deflective element is illustrated as an example of an optical device as a control target of the arithmetic processing circuit. The control target (optical device) of the present invention is not limited to this but can be applied to various optical devices (for example, an excitation light source that supplies excitation light to a rare-earth doped optical fiber for amplifying signal light, a variable optical attenuator that is optically coupled between two rare-earth doped optical fibers for amplifying signal light, and the like).

The followings is added based on the above-described embodiments.

(Clause 1)

A trouble tracing system for tracing information on a trouble in a device having an arithmetic processing circuit, comprising:

a volatile memory connected to the arithmetic processing circuit;

a nonvolatile memory connected to the arithmetic processing circuit, wherein when the device operates normally, the arithmetic processing circuit periodically generates an operation trace log which is information on an operation of the device and periodically stores the operation trace log in the volatile memory, and when a trouble occurs in the device, the arithmetic processing circuit stores, in a trouble trace information storage area of the nonvolatile memory, one or a plurality of operation trace logs generated before the trouble occurs together with a trouble log which is information on the trouble.

(Clause 2)

The trouble tracing system according to Clause 1, wherein
the nonvolatile memory has a plurality of trouble trace information storage areas, and
the arithmetic processing circuit sequentially stores one or the plurality of operation trace logs and trouble logs in the plurality of trouble trace information storage areas whenever the trouble occurs in the device.

(Clause 3)

The trouble tracing system according to Clause 1 or 2, wherein
a capacity of the nonvolatile memory is larger than a capacity of the volatile memory.

(Clause 4)

The trouble tracing system according to any one of Clauses 1 to 3, wherein
the operation trace log is stored in the volatile memory in a first-in-first-out manner.

(Clause 5)

The trouble tracing system according to any one of Clauses 1 to 4, wherein
the trouble log includes an error code which is information on a type of the trouble in the device.

(Clause 6)

The trouble tracing system according to any one of Clauses 1 to 5, wherein
the operation trace log includes time information on the time when the operation trace log is generated,
the trouble log includes time information on the time when the trouble log is generated, and
the arithmetic processing circuit stores the operation trace log older than the trouble log in the trouble trace information storage area together with the trouble log when the trouble occurs in the device.

(Clause 7)

The trouble tracing system according to any one of Clauses 1 to 6, further comprising:
a data output port for extracting the trouble log and the operation trace log from the nonvolatile memory.

(Clause 8)

An optical module used in optical communication systems, comprising:
an optical device driven by a driving voltage;
an arithmetic processing circuit;
a voltage generating unit that receives an output signal from the arithmetic processing circuit to generate the driving voltage of a magnitude corresponding to the output signal; and
the trouble tracing system according to any one of Clauses 1 to 7, for tracing information on a trouble in the optical module.

(Clause 9)

The optical module used in optical communication systems according to Clause 8, further comprising:
a first temperature sensor that outputs a first temperature signal indicating a temperature of a predetermined location in the optical module used in optical communication systems; and
a temperature monitoring unit that provides first temperature information based on the first temperature signal to the arithmetic processing circuit, wherein
when the first temperature information indicates an abnormal value, the arithmetic processing circuit determines that the first temperature information is the trouble log.

(Clause 10)

The optical module used in optical communication systems according to Clause 9, wherein
when the first temperature information exceeds a predetermined temperature, the arithmetic processing circuit determines that the first temperature information is the trouble log.

(Clause 11)

The optical module used in optical communication systems according to Clause 9, further comprising:
a second temperature sensor that outputs a second temperature signal indicating a temperature of another location in the optical module used in optical communication systems to the temperature monitoring unit, wherein
the temperature monitoring unit provides second temperature information based on the second temperature signal to the arithmetic processing circuit, and
when a value obtained by comparing the first temperature information and the second temperature information exceeds a predetermined value, the arithmetic processing circuit determines that the first temperature information is the trouble log.

(Clause 12)

The optical module used in optical communication systems according to any one of Clause 8 to 11, wherein
the optical device is an optical deflective element for a wavelength selective switch.

What is claimed is:

1. An optical module used in optical communication systems, comprising:
an optical device driven by a driving voltage;
an arithmetic processing chip including an arithmetic processing circuit that operates according to predetermined firmware and generates an electrical control signal indicating a magnitude of the driving voltage;
a voltage generating unit provided outside the arithmetic processing chip, and including an input terminal that receives the control signal from the arithmetic processing chip and an output terminal that provides the driving voltage of a magnitude corresponding to the control signal to the optical device; and
a voltage holding unit that holds an output voltage from the output terminal of the voltage generating unit at a constant voltage regardless of an operation state of the arithmetic processing circuit, when the firmware is updated, wherein the voltage holding unit is connected between the arithmetic processing chip and the input terminal of the voltage generating unit, and provides a control signal indicating the constant voltage to the input terminal of the voltage generating unit instead of the control signal indicating the magnitude of the driving voltage, when the firmware is updated.

2. The optical module used in optical communication systems according to claim 1, wherein
the constant voltage is the same as the driving voltage immediately before the firmware is updated.

3. The optical module used in optical communication systems according to claim 1, wherein
the firmware is formed of a software program, and
the arithmetic processing circuit includes a CPU that operates by reading the software program from a memory that stores the software program.

4. The optical module used in optical communication systems according to claim 1, wherein
the arithmetic processing circuit includes rewritable hardware capable of rewriting an internal circuit expressed by the firmware.

5. The optical module used in optical communication systems according to claim 1, wherein
the optical device is an optical deflective element for a wavelength selective switch.

6. The optical module used in optical communication systems according to claim 1, wherein
the optical device is an excitation light source that supplies excitation light to an optical amplification unit for amplifying signal light.

7. The optical module used in optical communication systems according to claim 1, wherein
the optical device is a variable optical attenuator that is optically coupled between a first optical amplification unit and a second optical amplification unit for amplifying signal light.

8. An optical module used in optical communication systems, comprising:
an optical device driven by a driving voltage;
an arithmetic processing chip including an arithmetic processing circuit that operates according to predetermined firmware and generates an electrical control signal indicating a magnitude of the driving voltage;
a voltage generating unit provided outside the arithmetic processing chip, and including an input terminal that receives the control signal from the arithmetic processing chip and an output terminal that provides the driving voltage of a magnitude corresponding to the control signal to the optical device; and
a voltage holding unit that holds an output voltage from the output terminal of the voltage generating unit at a constant voltage regardless of an operation state of the arithmetic processing circuit, when the firmware is update, wherein:
the voltage generating unit further includes a chip selector input terminal that receives a chip selector signal, and switches between the output of the driving voltage of a magnitude corresponding to the control signal and the output of the constant voltage based on the chip selector signal, and
the voltage holding unit generates the chip selector signal so that the voltage generating unit outputs the constant voltage when the firmware is updated.

9. A method of updating firmware of an optical module used in optical communication systems, the method comprising:
generating, by an arithmetic processing chip including an arithmetic processing circuit that operates predetermined firmware, an electrical control signal indicating a magnitude of a driving voltage for an optical device that is driven by the driving voltage;
providing, by a voltage generating unit that is provided outside the arithmetic processing chip, the driving voltage of a magnitude corresponding to the control signal to the optical device, wherein the voltage generating unit comprises an input terminal and an output terminal;
holding, by a voltage bolding unit, an output voltage from the output terminal of the voltage generating unit at a constant voltage and storing configuration information immediately before the firmware is updated, wherein the voltage holding unit is connected between the arithmetic processing chip and the input terminal of the voltage generating unit, and provides a control signal indicating the constant voltage to the input terminal of the voltage generating unit instead of the control signal indicating the magnitude of the driving voltage, when the firmware is updated;
rewriting the firmware; and
resetting the arithmetic processing circuit and restoring the configuration information immediately before the firmware is updated to allow the optical device to continue operating.

* * * * *